(12) United States Patent
Brenner

(10) Patent No.: US 10,083,552 B2
(45) Date of Patent: Sep. 25, 2018

(54) COMPARING VEHICLE PERFORMANCE

(71) Applicant: XL Hybrids, Boston, MA (US)

(72) Inventor: Neal Ennis Brenner, Needham, MA (US)

(73) Assignee: XL Hybrids, Boston, MA (US)

( * ) Notice: Subject to any disclaimer, the term of this patent is extended or adjusted under 35 U.S.C. 154(b) by 0 days.

(21) Appl. No.: 15/810,530

(22) Filed: Nov. 13, 2017

(65) Prior Publication Data

US 2018/0225893 A1    Aug. 9, 2018

Related U.S. Application Data

(63) Continuation of application No. 14/019,908, filed on Sep. 6, 2013, now Pat. No. 9,818,240.

(51) Int. Cl.
| | |
|---|---|
| *G07C 5/08* | (2006.01) |
| *B60R 16/02* | (2006.01) |
| *B60W 50/14* | (2012.01) |
| *G01C 21/34* | (2006.01) |
| *G01C 21/36* | (2006.01) |
| *B60R 16/023* | (2006.01) |

(52) U.S. Cl.
CPC ............ *G07C 5/08* (2013.01); *B60R 16/0232* (2013.01); *B60R 16/0236* (2013.01); *B60W 50/14* (2013.01); *G01C 21/3469* (2013.01); *G01C 21/3697* (2013.01)

(58) Field of Classification Search
CPC ........... B60R 16/0232; B60R 16/0236; B60W 50/14; G01C 21/3697; G01C 21/3469
See application file for complete search history.

(56) References Cited

U.S. PATENT DOCUMENTS

| | | | |
|---|---|---|---|
| 1,696,599 | A | 12/1928 | Forsberg |
| 1,790,634 | A | 1/1931 | Arendt |
| 2,132,450 | A | 10/1938 | Wolf |
| 3,493,066 | A | 2/1970 | Dooley |
| 3,732,751 | A | 5/1973 | Berman et al. |
| 3,874,472 | A | 4/1975 | Deane |
| 3,923,115 | A | 12/1975 | Helling |
| 4,042,056 | A | 8/1977 | Horwinski |

(Continued)

OTHER PUBLICATIONS

Abdi, Herve, "Normalizing Data," Encyclopedia of Research Design (2010), 4 pages.

(Continued)

*Primary Examiner* — Thomas P Ingram
(74) *Attorney, Agent, or Firm* — Fish & Richardson P.C.

(57) ABSTRACT

A computing device-implemented method includes receiving data representative of one or more travel parameters for distribution ranges for a vehicle that includes a first propulsion system, and, receiving data representative of one or more travel parameters for distribution ranges for a vehicle that includes a second propulsion system. The distribution ranges for the vehicle that includes the first propulsion system are equivalent to the distribution ranges for the vehicle that includes the second propulsion system. The method also includes receiving data representative of one or more travel parameters for distribution ranges for a collection of vehicles. The distribution ranges for the collection of vehicles are equivalent to the distribution ranges for the vehicle that includes the second propulsion system.

25 Claims, 9 Drawing Sheets

(56) References Cited

U.S. PATENT DOCUMENTS

| | | |
|---|---|---|
| 4,233,858 A | 11/1980 | Rowlett |
| 4,305,254 A | 12/1981 | Kawakatsu et al. |
| 4,811,804 A | 3/1989 | Ewers et al. |
| 5,125,469 A | 6/1992 | Scott |
| 5,161,638 A | 11/1992 | Hirano |
| 5,267,623 A | 12/1993 | Kashiwagi |
| 5,272,939 A | 12/1993 | Markyvech et al. |
| 5,359,228 A | 10/1994 | Yoshida |
| 5,441,122 A | 8/1995 | Yoshida |
| 5,487,002 A | 1/1996 | Diller et al. |
| 5,490,063 A | 2/1996 | Genise |
| 5,558,588 A | 9/1996 | Schmidt |
| 5,627,752 A | 5/1997 | Buck et al. |
| 5,778,326 A | 7/1998 | Moroto et al. |
| 5,856,709 A | 1/1999 | Ibaraki et al. |
| 5,927,829 A | 7/1999 | Saga et al. |
| 6,176,808 B1 | 1/2001 | Brown et al. |
| 6,269,290 B1 | 7/2001 | Egami et al. |
| 6,314,347 B1 | 11/2001 | Kuroda et al. |
| 6,328,671 B1 | 12/2001 | Nakajima et al. |
| 6,356,818 B1 | 3/2002 | Wakashiro et al. |
| 6,367,570 B1 | 4/2002 | Long, III et al. |
| 6,520,160 B2 | 2/2003 | Kojima et al. |
| 6,533,692 B1 | 3/2003 | Bowen |
| 6,630,813 B2 | 10/2003 | Berels et al. |
| 6,668,954 B2 | 12/2003 | Field |
| 6,687,581 B2 | 2/2004 | Deguchi et al. |
| 6,826,460 B2 | 11/2004 | Kittell et al. |
| 6,868,927 B2 | 3/2005 | Boll et al. |
| 7,013,205 B1 | 3/2006 | Hafner et al. |
| 7,104,347 B2 | 9/2006 | Severinsky et al. |
| 7,214,156 B2 | 5/2007 | Oliver |
| 7,258,183 B2 | 8/2007 | Leonardi et al. |
| 7,271,555 B1 | 9/2007 | Ciccone |
| 7,367,415 B2 | 5/2008 | Oliver et al. |
| 7,395,887 B2 | 7/2008 | Viergever et al. |
| 7,419,021 B2 | 9/2008 | Morrow et al. |
| 7,434,640 B2 | 10/2008 | Hughes |
| 7,434,641 B2 | 10/2008 | Takami et al. |
| 7,559,578 B2 | 7/2009 | van Leeve et al. |
| 7,610,124 B2 | 10/2009 | Wakashiro et al. |
| 7,647,994 B1 | 1/2010 | Belloso |
| 7,647,997 B2 | 1/2010 | Oliver |
| 7,665,560 B2 | 2/2010 | Gelinas |
| 7,674,994 B1 | 3/2010 | Valerio |
| 7,681,676 B2 | 3/2010 | Kydd |
| 7,849,944 B2 | 12/2010 | DeVault |
| 7,921,950 B2 | 4/2011 | Harris |
| 7,926,387 B2 | 4/2011 | Horiuchi et al. |
| 7,954,579 B2 | 6/2011 | Rodriguez et al. |
| 8,215,442 B2 | 7/2012 | Ishii |
| 8,256,549 B2 | 9/2012 | Crain et al. |
| 8,337,359 B2 | 12/2012 | Hofbauer |
| 8,469,137 B2 | 6/2013 | Fujii |
| 8,596,391 B2 | 12/2013 | Kshatriya |
| 8,630,784 B2 | 1/2014 | Bai |
| 9,818,240 B1 | 11/2017 | Brenner |
| 9,922,469 B1 | 3/2018 | Ashton et al. |
| 2003/0010563 A1 | 1/2003 | Osuga et al. |
| 2005/0205313 A1 | 9/2005 | Gilmore et al. |
| 2006/0000650 A1 | 1/2006 | Hughey |
| 2006/0030450 A1 | 2/2006 | Kyle |
| 2006/0213703 A1 | 9/2006 | Long |
| 2006/0293841 A1 | 12/2006 | Hrovat et al. |
| 2007/0027593 A1 | 2/2007 | Shah et al. |
| 2007/0129878 A1 | 6/2007 | Pepper |
| 2007/0135988 A1* | 6/2007 | Kidston .............. B60R 16/0232 701/102 |
| 2007/0137919 A1 | 6/2007 | Jolley |
| 2007/0163819 A1 | 7/2007 | Richter et al. |
| 2008/0208393 A1 | 8/2008 | Schricker |
| 2008/0213703 A1 | 9/2008 | Shafer et al. |
| 2008/0236910 A1 | 10/2008 | Kejha et al. |
| 2008/0319596 A1 | 12/2008 | Yamada |
| 2009/0015202 A1 | 1/2009 | Miura |
| 2009/0192660 A1 | 7/2009 | Tamor et al. |
| 2009/0198398 A1 | 8/2009 | Yamada |
| 2009/0212626 A1 | 8/2009 | Snyder et al. |
| 2009/0223725 A1 | 9/2009 | Rodriguez et al. |
| 2009/0259355 A1 | 10/2009 | Li |
| 2010/0001672 A1 | 1/2010 | Maeda et al. |
| 2010/0044129 A1 | 2/2010 | Kyle |
| 2010/0106351 A1 | 4/2010 | Hanssen et al. |
| 2010/0219007 A1 | 9/2010 | Dalum et al. |
| 2010/0274426 A1 | 10/2010 | Le Brusq et al. |
| 2011/0024211 A1 | 2/2011 | Kikuchi |
| 2011/0029173 A1 | 2/2011 | Hyde et al. |
| 2011/0029181 A1 | 2/2011 | Hyde et al. |
| 2011/0047102 A1 | 2/2011 | Grider et al. |
| 2011/0071712 A1 | 3/2011 | Mizuno et al. |
| 2011/0098873 A1 | 4/2011 | Koga et al. |
| 2011/0148618 A1 | 6/2011 | Harumoto et al. |
| 2011/0160990 A1 | 6/2011 | Mineta |
| 2011/0270486 A1 | 11/2011 | Stevens et al. |
| 2012/0065834 A1 | 3/2012 | Senart et al. |
| 2012/0072049 A1* | 3/2012 | Haaf ........................ G01D 4/00 701/1 |
| 2012/0239462 A1 | 9/2012 | Pursell et al. |
| 2012/0323474 A1 | 12/2012 | Breed et al. |
| 2013/0046526 A1 | 2/2013 | Yucel et al. |
| 2013/0060410 A1 | 3/2013 | Crain et al. |

OTHER PUBLICATIONS

What is the Best Car to Convert to Electric? [online] (posted on May 10, 2012), 6 pages. Retrieved from the Internet on Aug. 21, 2015, at: http://www.howtoelectriccar.com/what-is-the-best-car-for-electric-conversion/.

* cited by examiner

_Vehicle A_

| Vehicle Speed Range | Fuel Consumed (gal) | Time Spent (h) | Distance Driven (mi) | Fuel Economy (MPG) | Fuel Rate (gal/h) | % Distance |
|---|---|---|---|---|---|---|
| 0 MPH | 9.25 | 15.08 | 0.00 | 0.00 | 0.614 | 0.0% |
| 0 - 10 MPH | 4.62 | 4.21 | 20.69 | 4.48 | 1.097 | 1.9% |
| 10 - 20 MPH | 7.90 | 4.10 | 62.11 | 7.86 | 1.925 | 5.6% |
| 20 - 30 MPH | 14.28 | 7.32 | 188.75 | 13.22 | 1.951 | 17.2% |
| 30 - 40 MPH | 22.53 | 12.04 | 418.67 | 18.59 | 1.872 | 38.1% |
| 40 - 50 MPH | 7.79 | 3.55 | 154.34 | 19.82 | 2.194 | 14.0% |
| 50 - 60 MPH | 5.66 | 1.95 | 108.55 | 19.18 | 2.902 | 9.9% |
| 60 - 70 MPH | 7.28 | 2.06 | 133.24 | 18.31 | 3.526 | 12.1% |
| 70+ MPH | 0.76 | 0.18 | 13.15 | 17.35 | 4.120 | 1.2% |

_Vehicle B_

| Vehicle Speed Range | Fuel Consumed (gal) | Time Spent (h) | Distance Driven (mi) | Fuel Economy (MPG) | Fuel Rate (gal/h) | % Distance |
|---|---|---|---|---|---|---|
| 0 MPH | 7.96 | 13.84 | 0.00 | 0.00 | 0.575 | 0.0% |
| 0 - 10 MPH | 3.05 | 3.24 | 15.83 | 5.19 | 0.943 | 2.1% |
| 10 - 20 MPH | 4.45 | 3.17 | 48.28 | 10.84 | 1.407 | 6.3% |
| 20 - 30 MPH | 9.57 | 6.40 | 163.95 | 17.12 | 1.496 | 21.4% |
| 30 - 40 MPH | 15.71 | 9.30 | 322.19 | 20.51 | 1.689 | 42.1% |
| 40 - 50 MPH | 4.63 | 2.05 | 89.11 | 19.23 | 2.258 | 11.6% |
| 50 - 60 MPH | 3.45 | 1.16 | 64.49 | 18.68 | 2.979 | 8.4% |
| 60 - 70 MPH | 2.98 | 0.92 | 58.75 | 19.70 | 3.241 | 7.7% |
| 70+ MPH | 0.17 | 0.04 | 3.05 | 18.26 | 3.795 | 0.4% |

FIG. 4

*Vehicle Collection*

| Vehicle Speed Range | Fuel Consumed (gal) | Time Spent (h) | Distance Driven (mi) | Fuel Economy (MPG) | Fuel Rate (gal/h) | % Distance |
|---|---|---|---|---|---|---|
| 0 MPH | 13.48 | 26.74 | 0.00 | 0.00 | 0.504 | 0.0% |
| 0 - 10 MPH | 19.36 | 15.97 | 77.64 | 4.01 | 1.213 | 2.5% |
| 10 - 20 MPH | 33.08 | 17.47 | 266.62 | 8.06 | 1.894 | 8.5% |
| 20 - 30 MPH | 63.64 | 33.27 | 857.43 | 13.47 | 1.913 | 27.3% |
| 30 - 40 MPH | 67.06 | 34.19 | 1172.32 | 17.48 | 1.962 | 37.3% |
| 40 - 50 MPH | 13.28 | 5.52 | 240.64 | 18.12 | 2.404 | 7.7% |
| 50 - 60 MPH | 17.01 | 5.61 | 313.33 | 18.42 | 3.035 | 10.0% |
| 60 - 70 MPH | 11.95 | 3.42 | 214.59 | 17.96 | 3.489 | 6.8% |
| 70+ MPH | 0.10 | 0.02 | 1.67 | 17.56 | 4.033 | 0.1% |

COMPARING VEHICLE PERFORMANCE

CLAIM OF PRIORITY

This application is a continuation application and claims priority under 35 U.S.C. § 120 to U.S. patent application Ser. No. 14/019,908, filed on Sep. 6, 2013, the entire contents of which are hereby incorporated by reference.

BACKGROUND

This description relates to techniques for collecting, processing, and presenting hybrid vehicle performance information.

With the increased interest in reducing dependency on fossil fuels, the use of alternative energy sources has been incorporated into various applications such as transportation. Both public and private transportation vehicles have been developed to run on a fuel other than traditional petroleum based fuels (i.e., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

The systems and techniques described here relate to computing and presenting performance and comparison metrics of vehicles operated with an alternative energy based system (e.g., an electric motor) and a traditional petroleum based engine (e.g., a combustion engine). Different travel parameters (e.g., distance traveled, fuel consumed, operating time, etc.) are collected for distributions of data (e.g., distributed over ranges of vehicle speeds) and processed for presenting comparisons of the different propulsion systems. Along with comparing two particular vehicles, data from a collection of vehicles (e.g., a fleet of combustion engine vehicles) can be used for quantifying performance improvements (e.g., fuel efficiency) by using an alternative energy based system.

In one aspect a computing device-implemented method includes receiving data representative of one or more travel parameters for distribution ranges for a vehicle that includes a first propulsion system. The method also includes receiving data representative of one or more travel parameters for distribution ranges for a vehicle that includes a second propulsion system. The distribution ranges for the vehicle that includes the first propulsion system are equivalent to the distribution ranges for the vehicle that includes the second propulsion system. The method also includes receiving data representative of one or more travel parameters for distribution ranges for a collection of vehicles. The distribution ranges for the collection of vehicles are equivalent to the distribution ranges for the vehicle that includes the second propulsion system. The method also includes determining a first performance metric from the distribution for the vehicle that includes the first propulsion system and the distribution for the collection of vehicles, and a second performance metric from the distribution for the vehicle that includes the second propulsion system and the distribution for the collection of vehicles. The method also includes determining a comparison metric of the vehicle including the first propulsion system and the vehicle including the second propulsion system from the first performance metric and the second performance metric. The method also includes presenting the comparison metric of the vehicle including the first propulsion system and the vehicle including the second propulsion system.

Implementations may include any or all of the following features. The first propulsion system may include a combustion engine. The second propulsion system may include an alternative fuel system. The ranges of the distribution of the vehicle that includes the first propulsion system may represent speeds. The ranges of the distribution of the vehicle that includes the first propulsion system may represent accelerations. At least one of the travel parameters of the distribution of the collection of vehicles may represent distance traveled for each range. The comparison metric may represent fuel savings between the vehicle that includes the second propulsion system and the vehicle that includes the first propulsion system. The vehicle that includes the second propulsion system may also include the first propulsion system. The collection of combustion engine vehicles may include vehicles of equivalent type. Determining the comparison metric may be executed external to the vehicle that includes the first propulsion system and the vehicle that includes the second propulsion system.

In another aspect, a system includes a computing device that includes a memory configured to store instructions. The computing device also include a processor to execute the instructions to perform operations including receiving data representative of one or more travel parameters for distribution ranges for a vehicle that includes a first propulsion system. Operations also include receiving data representative of one or more travel parameters for distribution ranges for a vehicle that includes a second propulsion system. The distribution ranges for the vehicle that includes the first propulsion system are equivalent to the distribution ranges for the vehicle that includes the second propulsion system. Operations also include receiving data representative of one or more travel parameters for distribution ranges for a collection of vehicles. The distribution ranges for the collection of vehicles are equivalent to the distribution ranges for the vehicle that includes the second propulsion system. Operations also include determining a first performance metric from the distribution of the vehicle that includes the first propulsion system and the distribution of the collection of vehicles, and a second performance metric from the distribution of the vehicle that includes the second propulsion system and the distribution of the collection of vehicles. Operations also include determining a comparison metric of the vehicle including the first propulsion system and the vehicle including the second propulsion system from the first performance metric and the second performance metric. Operations also include presenting the comparison metric of the vehicle including the first propulsion system and the vehicle including the second propulsion system.

Implementations may include any or all of the following features. The first propulsion system may include a combustion engine. The second propulsion system may include an alternative fuel system. The ranges of the distribution of the vehicle that includes the first propulsion system may represent speeds. The ranges of the distribution of the vehicle that includes the first propulsion system may represent accelerations. At least one of the travel parameters of the distribution of the collection of vehicles may represent distance traveled for each range. The comparison metric may represent fuel savings between the vehicle that includes the second propulsion system and the vehicle that includes the first propulsion system. The vehicle that includes the second propulsion system may also include the first propulsion system. The collection of combustion engine vehicles may include vehicles of equivalent type. Determining the comparison metric may be executed external to the vehicle that includes the first propulsion system and the vehicle that includes the second propulsion system.

In another aspect, one or more computer readable media storing instructions that are executable by a processing device, and upon such execution cause the processing device to perform operations that include receiving data representative of one or more travel parameters for distribution ranges for a vehicle that includes a first propulsion system. Operations also include receiving data representative of one or more travel parameters for distribution ranges for a vehicle that includes a second propulsion system. The distribution ranges of the vehicle that includes the first propulsion system are equivalent to the distribution ranges of the vehicle that includes the second propulsion system. Operations also include receiving data representative of one or more travel parameters for distribution ranges for a collection of vehicles. The distribution ranges of the collection of vehicles are equivalent to the distribution ranges of the vehicle that includes the second propulsion system. Operations also include determining a first performance metric from the distribution of the vehicle that includes the first propulsion system and the distribution of the collection of vehicles, and a second performance metric from the distribution of the vehicle that includes the second propulsion system and the distribution of the collection of vehicles. Operations also include determining a comparison metric of the vehicle including the first propulsion system and the vehicle including the second propulsion system from the first performance metric and the second performance metric. Operations also include presenting the comparison metric of the vehicle including the first propulsion system and the vehicle including the second propulsion system.

Implementations may include any or all of the following features. The first propulsion system may include a combustion engine. The second propulsion system may include an alternative fuel system. The ranges of the distribution of the vehicle that includes the first propulsion system may represent speeds. The ranges of the distribution of the vehicle that includes the first propulsion system may represent accelerations. At least one of the travel parameters of the distribution of the collection of vehicles may represent distance traveled for each range. The comparison metric may represent fuel savings between the vehicle that includes the second propulsion system and the vehicle that includes the first propulsion system. The vehicle that includes the second propulsion system may also include the first propulsion system. The collection of combustion engine vehicles may include vehicles of equivalent type. Determining the comparison metric may be executed external to the vehicle that includes the first propulsion system and the vehicle that includes the second propulsion system.

These and other aspects, features and various combinations may be expressed as methods, apparatus, systems, means for performing functions, program products, and in other ways.

Other features and advantages will be apparent from the description and the claims.

DESCRIPTION OF DRAWINGS

FIG. 4 is a chart of performance information of a combustion engine vehicle and an alternative energy vehicle.

DETAILED DESCRIPTION

Figure 1:
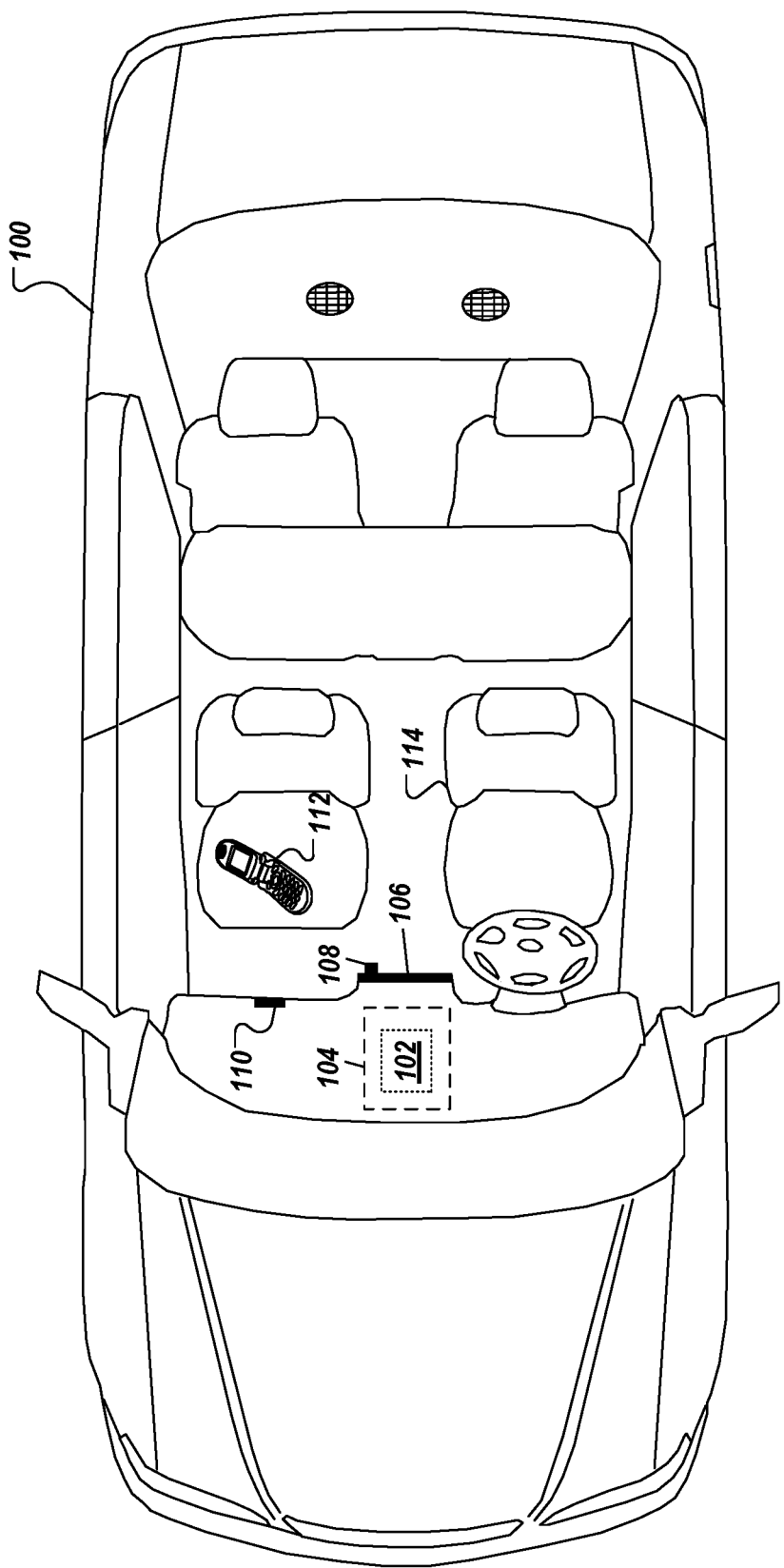
FIG. 1 illustrates a vehicle that includes a performance manager.

Referring to FIG. 1, alternative fuel vehicles may solely rely upon non-petroleum energy sources, such as electricity, natural gas, biofuels etc. Rather than sole reliance on such energy sources, alternative fuel vehicles may also rely partially on an internal combustion engine along with one or more alternative energy sources. For example, a vehicle (referred to as a hybrid vehicle) may use two or more distinct power sources, such as an electric motor and an internal combustion engine (referred to as a hybrid electric vehicle (HEV)). Some hybrid vehicles (referred to as plug-in hybrid vehicles) may operate by using energy storage devices that can be replenished (e.g., rechargeable batteries). For electrical energy storage devices, in some arrangements, one or more techniques may be implemented for charging and recharging the devices. For example, batteries may be charged through regenerative braking, strategic charging techniques, etc. during appropriate operating periods of the vehicle. In general, while energy is typically lost as heat in conventional braking systems, a regenerative braking system may recover this energy by using an electric generator to assist braking operations. Some systems and techniques may also strategically collect (e.g., leech) energy from the combustion engine during periods of efficient operation (e.g., coasting, traveling, etc.) and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine. One or more control strategies may be used to determine these time periods. Similarly, periods of time may also be determined to engage regenerative braking and strategic charging in order to replenish energy storage. Other operations of the vehicle (e.g., accelerate, decelerate, gear changes, etc.) may also be defined for the control strategies. By developing such strategies to control the assistance provided to combustion engines (during low efficiency periods), energy may be conserved without negatively impacting vehicle performance.

Some vehicle manufacturers may recommend operations and control strategies for entire classes of vehicles or other types of large vehicle groups (e.g., same model vehicles, same vehicle line, etc.) at particular times (e.g., at the release of the vehicle line). Similarly, the level of assistance provided by an electric motor or other type of alternative fuel system may be a constant. One or more techniques may be implemented to improve recommended operations and control strategies. For example, vehicle performance may be measured to quantify improvements. Fuel efficiency (e.g., miles-per-gallon achieved by the vehicle), fuel consumption (e.g., fuel gallons consumed per hour), and other types of performance measures may be developed and report noticeable to considerable improvement. Once analyzed, the improvements may be incorporated into recommended operations and control strategies. For example, the retrieved data might report that energy provided by the alternative fuel during higher speed operation does not reduce fuel consumption compared to fuel consumption experienced at lower speeds.

As illustrated in the figure, an example vehicle 100 (e.g., a hybrid automobile) is able to collect and process performance information for fuel economy comparisons. From the collected and analyzed performance information, operations of the vehicle may be adjusted to improve performance (e.g., operations of its alternative fuel system such as an electric motor). To provide this capability, the vehicle includes a performance manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the performance manager 102 may operate in a generally autonomous manner, however, information from one or more users (e.g., identification of the vehicle operators) may be collected for operations of the performance manager. To collect performance information of the vehicle, data may be collected from one or a variety of inputs. For example, the performance manager 102 may communicate with one or more portions of the vehicle. One or more sensors, components, processing units, etc. of the vehicle may exchange data with the performance manager 102. For example, operational information of the vehicle such as speed, acceleration, etc. may be collected over time (e.g., as the vehicle operates) and provided to the performance manager 102. Other operational information may also be provided from the vehicle; for example, data representing braking, steering, etc. may also be provided to the performance manager 102. Vehicle components that provide information to the performance manager 102 may also include interface modules, circuitry, etc. for controlling the operations of the combustion engine, the electrical motor, etc.

In some situations, data from sources other than the vehicle may also be collected. For example, user input may be provided. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the performance manager 102. To interact with the electronic display 106, a knob 108 illustrates a potential control device; however, one or more other types of devices may be used for user interaction (e.g., a touch screen display, etc.). Similar to using one or more sensors to collect operational data, other types of information may also be gathered; for example, a sensor 110 (here embedded in the dashboard of the vehicle 100) may collect information such as cabin temperature, location of the vehicle (e.g., the sensor being a component of a global positioning system (GPS)) and other types of information. By collecting information such as GPS location, additional information may be provided to the performance manager 102 (e.g., location and destination information) which may be used for quantifying vehicle performance. In some arrangements, information from other vehicles may be used by the performance manager 102. For example, data may be collected from a fleet of vehicles (e.g., similar or dissimilar to the vehicle 100) and used to quantify performance (e.g., based on similarly traveled routes). While one sensor 110 is illustrated in this example, multiple sensors may be located internally or externally to the vehicle for collecting information (e.g., internal or external temperature, etc.). One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the performance manager 102 (e.g., identify driving characteristics of a vehicle operator). Similarly, portions of the vehicle itself (e.g., vehicle components) may collect information for the performance manager 102; for example, one or more of the seats of the vehicle 100 (e.g., driver seat 114) may collect information (e.g., position of the seat to estimate the driver's weight) that is then for being provided to the performance manager 102. Processed data may also be provided; for example, gathered information may be processed by one or more computing devices (e.g., controllers) before being provided to the performance manager 102.

In general, the collected operational information (vehicle speed, acceleration, etc.) can be used for defining one or more data distributions. For example, the vehicle may operate over ranges of speeds, accelerations, etc., based on the operational environment. For highways, remote rural settings, etc. the vehicle may be driven at relatively high speeds for long periods of time. Alternatively, in a busy urban setting, the vehicle may be operated over a larger range of speeds (e.g., slow speeds due to congested traffic) for relatively short periods of time. Data from the vehicle may be associated with these ranges of operating speeds, accelerations, etc. For example, time spent operating within a speed range, distance covered while operating within the speed range, fuel consumed while operating within the speed range, etc. may be collected from the vehicle and associated with a speed range. By viewing this data (e.g., time spent, distance driven, fuel consumed, etc.) as a distribution defined by the speed ranges, vehicle performance may be analyzed for speed ranges. From the analysis, fuel economy and other types of performance measures can be determined and compared for different vehicles that have been driven on similar or different routes. One or more control strategies may also be developed from the data distributions and analysis. For example, strategies may be developed for controlling an alternative fuel system of a hybrid vehicle (e.g., an electric motor) to assist the combustion engine of the vehicle to improve overall performance.

In some arrangements, along with collecting information at the vehicle, remotely located information sources may be accessed by the vehicle. Similarly, some or all of the functionality of the performance manager 102 may be provided from a remote location. While residing onboard the vehicle 100 in illustrated figure, in some arrangements, the performance manager 102 or a portion of the performance manager may be located and executed at one or more other locations. In such situations, the vehicle 100 may be provided assistance from a remotely located performance manager by using one or more communication techniques and methodologies. For example, one or more wireless communication techniques (e.g., radio frequency, infrared, etc.) may be utilized that call upon one or more protocols and/or standards (e.g., the IEEE 802.11 family of standards such as Wi-Fi, the International Mobile Telecommunications-2000 (IMT-2000) specifications such as 3rd generation mobile telecommunications (3G), 4th generation cellular wireless standards (4G), wireless technology standards for exchanging data over relatively short distances such as Bluetooth, etc.).

Figure 2:
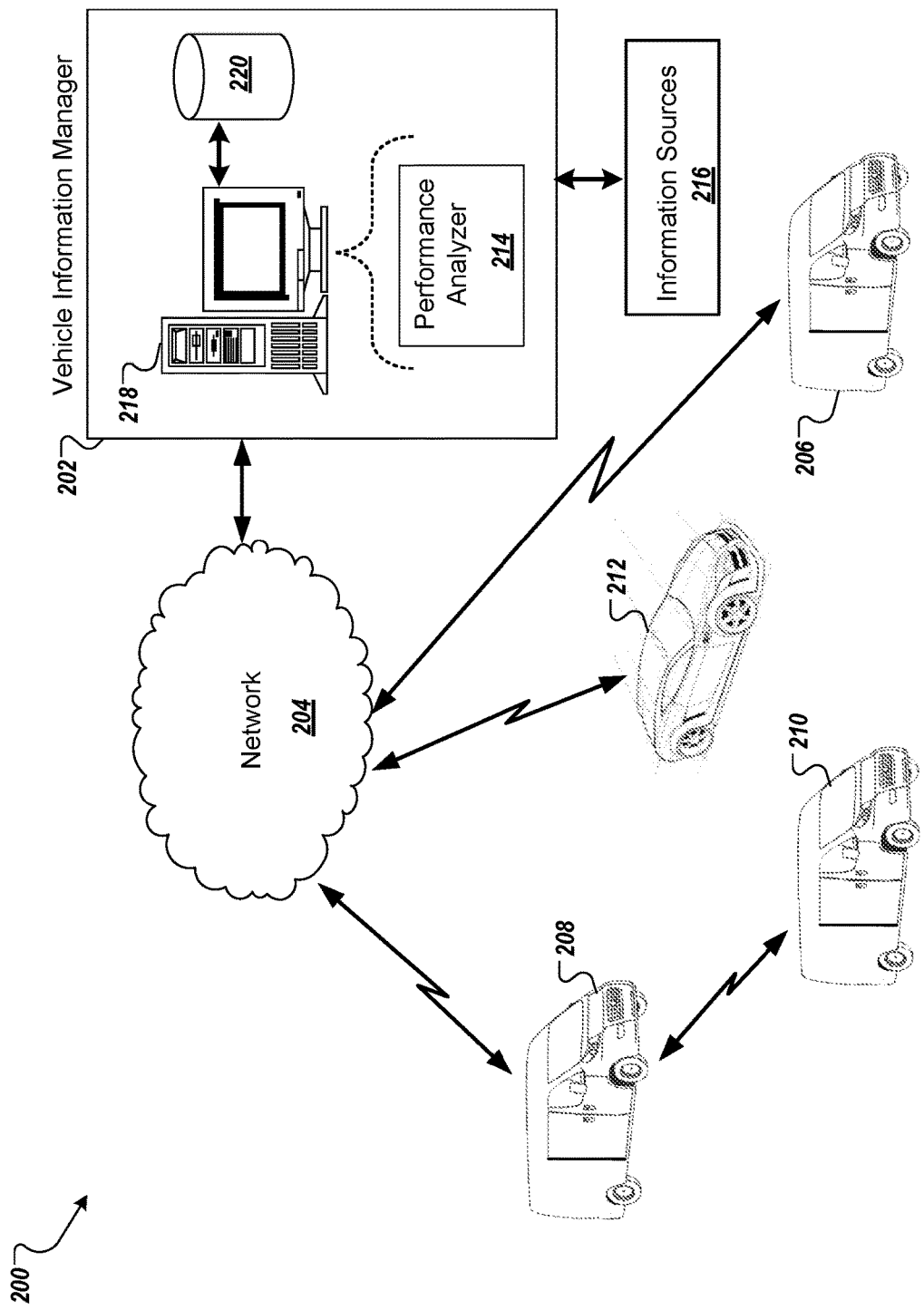
FIG. 2 illustrates a network-based performance analyzer for comparing performance information of multiple vehicles.

Referring to FIG. 2, an information exchanging environment 200 is presented that allows information to be provided to a central location for analyzing vehicle performance, such as potential improvements through use of alternative fuel vehicles such as hybrid vehicles. In some arrangements, the information is collected from individual vehicles or other information sources for the performance analysis. One or more techniques and methodologies may be implemented for providing such information to the vehicles. For example, one or more communication techniques and network architectures may be used for exchanging information. In the illustrated example a vehicle information manager 202 communicates through a network 204 (e.g., the Internet, an intranet, a combination of networks, etc.) to exchange information with a collection of vehicles (e.g., a small fleet of supply trucks 206, 208, 210, and an automobile 212). For comparative analysis, one or more of the vehicles may operate with an alternative fuel system (e.g., the supply truck 206 is a hybrid).

In some arrangements, the network architecture 204 may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle information manager 202 and other potential network components (e.g., other vehicles, etc.).

One or more technologies may be used for exchanging information among the vehicle information manager 202, the network 204 (or networks) and the collection of vehicles. For example, wireless technology (capable of two-way communication) may be incorporated into the vehicles for exchanging information with the vehicle information manager 202. Along with providing and collecting information from the vehicles, the vehicle information manger 202 may be capable of processing information (e.g., in concert with a performance analyzer 214 to quantify vehicle performance, compare vehicle performance, etc.) and executing related operations (e.g., store collected and processed information). In some arrangements, the vehicle information manager 202 may operate as a single entity; however, operations may be distributed among various entities to provide the functionality. In some arrangements, some functionality (e.g., operations of the performance analyzer 214) may be considered a service, rather than a product, and may be attained by entering into a relationship with the vehicle information manager 202 (e.g., purchase a subscription, enter into a contractual agreement, etc.). As such, the vehicle information manager 202 may be considered as being implemented as a cloud computing architecture in which its functionality is perceived by users (e.g., vehicle operators, business operators, vehicle designers and manufacturers, etc.) as a service rather than a product. For such arrangements, users may be provided information (e.g., vehicle performance, comparative performances, control strategies, etc.) from one or more shared resources (e.g., hardware, software, etc.) used by the vehicle information manager 202. For service compensation, one or more techniques may be utilized; for example, subscription plans for various time periods may be implemented (e.g., a time period for measuring the performance of a current fleet of vehicles along with candidate hybrid vehicles to demonstrate potential performance gains).

Similar to an onboard assistance manager (e.g., the performance manager 102 of FIG. 1), an off-vehicle performance analyzer (e.g., the performance analyzer 214) may use information from a vehicle (e.g., collected performance data, distributions of data, etc.) to determine one or more performance metrics of the vehicle, comparison metrics, etc.

Along with information being provided by one or more vehicles (e.g., received onboard, received through the network 204, etc.), the vehicle information manager 202 may utilize data from other sources for performance analysis, etc. For example, information sources 216 external to the vehicle information manager 202 may provide vehicle related information (e.g., manufacturer recommendations for performance, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle information manager 202; however, other communication techniques may also be implemented (e.g., information from the information sources 216 may be provided through one or more networks such as network 204).

In the illustrated example, to provide such functionality, the vehicle information manager 202 includes a server 218 that is capable of being provided information by the network 204 and the information sources 216. Additionally, the server 218 is illustrated as being in direct communication with a storage device 220 that is located at the vehicle information manager 202 (however, remotely located storage may be accessed by the server 218). In this example the functionality of the performance analyzer 214 is located off-board a vehicle while the functionality of the performance manager 102 (shown in FIG. 1) is located on-board the vehicle. In some examples, some functionality of the performance analyzer 214 and the performance manager 102 may be executed at other locations, distributed across multiple locations, etc. In one arrangement, a portion of the functionality of the performance analyzer 214 may be executed on-board a vehicle or a portion of the performance manager 102 may executed at the vehicle information manager 202. Information provided by one or more of the sources (e.g., the vehicles, information sources 216, etc.), performance metrics and comparisons may be developed by the performance analyzer 214. For example, one or more metrics may be determined that provides a measure of fuel economy of each vehicle, metrics that represent comparison between vehicles (e.g., fuel saving of a hybrid vehicle compared to a combustion engine vehicle). Along with determining such metrics and comparisons, functionality of the performance analyzer 214 may appropriately manage collected data, distributions, determined performance and comparison metrics, etc. for delivery (e.g., to service subscribers, entities, vehicles, etc.). For example, one or more database systems, data management architectures and communication schemes may be utilized by the performance analyzer 214 for information distribution. In some arrangements, such distribution functionality may be provided partially or fully by the performance analyzer 214 or external to the performance analyzer. In some arrangements this distributed functionality may be provided by other portions of the vehicle information manager 202 or provided by another entity separate from the information manager for distributing metrics and/or other types of performance and/or comparison based information. Further, while a single server (e.g., server 218) is implemented in this arrangement to provide the functionality for the vehicle information manager 202, additional servers or other types of computing devices may be used to provide the functionality. For example, operations of the performance analyzer 214 may be distributed among multiple computing devices in one or more locations.

Upon one or more metrics (e.g., performance, comparison, etc.) being produced, one or more operations may be executed to provide appropriate information, for example, to one or more entities, vehicles, etc. By employing one or more data transition techniques information may be delivered through the network 204 along with other types of communication systems. In some arrangements one or more trigger events may initiate the information being sent. For example, upon one or more messages, signals, etc. being received at the vehicle information manager 202 (e.g., a request for particular performance information is received), data representing the requested performance information may be provided.

Figure 3:
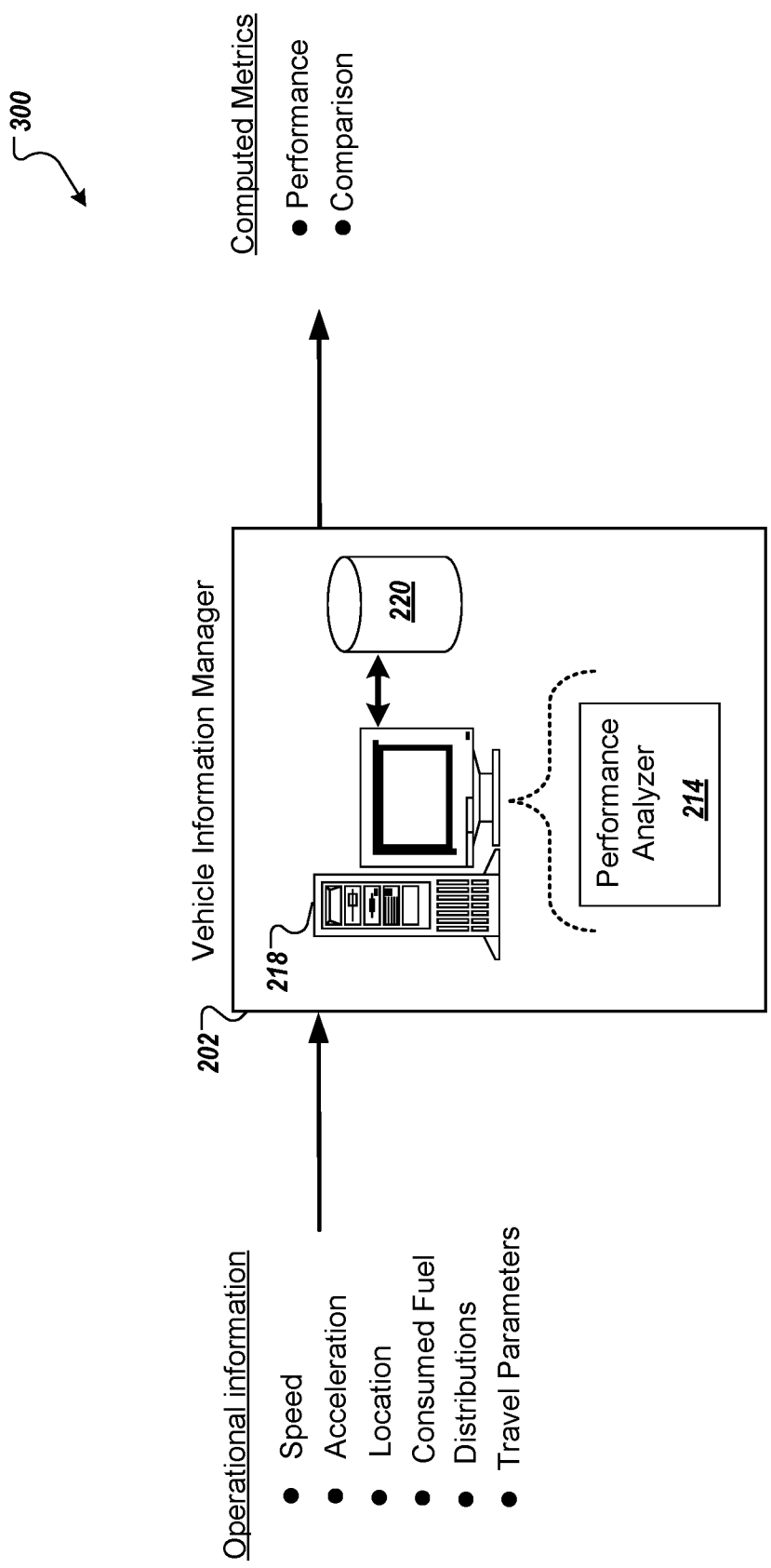
FIG. 3 illustrates the input and output data flow of a vehicle information manager.

Referring to FIG. 3, a graphical representation 300 illustrates data that may be provided to the performance analyzer 214 and data correspondingly produced (e.g., for presentation). In general, data representing operational information (e.g., speed, acceleration, location, fuel consumed, etc.) from one or more vehicles (e.g., combustion engine based vehicles, alternative energy based vehicles, etc.) is provided to the performance analyzer 214. In some arrangements, the operational information is provided as a time series of data as (e.g., by the performance manager 102); for example as the data is collected when the vehicle is under operation. Processed data (again from the performance manager 102) may also be provided, such as operational ranges (e.g., of the speeds, accelerations, etc.). In one arrangement, the provided ranges may be operating speeds of the vehicle (e.g., 0 MPH, 0-10 MPH, 10-20 MPH, 20-30 MPH, 30-40 MPH, 40-50 MPH, 50-60 MPH, 60-70 MPH, over 70 MPH). Similar data and ranges may also be provided for acceleration ranges or other types of operational information. In one arrangement, such ranges may be provided from the vehicle (e.g., the performance manager 102) to the vehicle information manager 202. However, such distributions may similarly be produced at the vehicle information manager 202 from vehicle provided data (e.g., time series data representing vehicle speed, acceleration, location, consumed fuel, etc.). As can be imagined, such provided data may be provided from a variety of sources; for example, near real-time data may be provided from the vehicles under operation, previously stored time series data retrieved from a storage device, etc.

Once identified, the ranges (e.g., speed ranges, acceleration ranges, etc.) can be used to produce distributions for different travel parameters associated with the operating state of the vehicle. Such travel parameters may represent one or more quantities that may be distributed based upon the ranges. For example, the amount of time that the vehicle operates in each range (e.g., time spent traveling between 10 and 20 MPH), distance traveled for each range (e.g., distance covered while traveling between 20 and 40 MPH), fuel consumed while operating within each range (e.g., gallons of fuel consumed while operating between 60 and 70 MPH), etc. may be represented by travel parameters. In some arrangements data is provided from one or more vehicles that represents the travel parameters (e.g., the amount of fuel consumed in each speed range). Travel parameters may also be determined external to the vehicle (e.g., at the vehicle information manager 202) or in concert with the vehicle (e.g., by the performance manager 102).

Such travel parameters may represent quantities that are not tied to a specific type of vehicle. For example, the time that a vehicle operates within a particular speed range (e.g., time spent traveling between 10 and 20 MPH) can be considered a travel parameter that holds for practically all types of vehicles (e.g., combustion engine vehicles, electric motor vehicles, hybrid vehicles, etc.). Other types of travel parameters may represent quantities related to particular types of vehicles; for example, a travel parameter may represent the amount of alternative energy (from an electric motor) applied to a driveline for a particular speed range or may represent the amount of alternative energy regenerated (e.g., electric energy for battery recharging) while the vehicle is operating in a particular speed range. In some arrangements, distribution data (e.g., provided by one or more travel parameters and a ranges of speeds) may be produced on-board the vehicle (e.g., by the performance manager 102) and provided to the performance analyzer 214. In other arrangements, one or more of the distributions may be produced by the performance analyzer 214. For example, provided time series data that represents the operating speeds, accelerations, location, consumed fuel, etc. of a vehicle, the performance analyzer 214 may determine a number of appropriate ranges along with the distribution of the times that the vehicle operated within each of the ranges.

Once the distributions are produced (e.g., time spent, distance covered, fuel consumed, etc. for each speed range), one or more operations may be executed by the performance analyzer 214 to produce metrics that are representative of the performance of the vehicle. For example, for each range, a performance metric such as average fuel efficiency (e.g., represented in miles-per-gallon), average fuel rate (e.g., represented in gallons-per-hour), percentage total distance traveled, etc. may be computed for each vehicle. Along with vehicle performance metrics, metrics that compare the performance of vehicles may be produced. For example, comparison metrics produced by the performance analyzer 214 may quantify the amount of improvement that may be achieved by replacing one type of vehicle with another. By using performance metrics determined for a combustion engine-based vehicle and a hybrid vehicle, one or more comparison metrics may be computed that may indicate improvements provided by a vehicle that uses an alternative fuel system.

Once calculated, one or more techniques and methodologies may be implemented to present the metrics. For example, graphical representations, such as one or more histograms, may be used to present data distributions. Other types of graphical representations may also be used to assist a viewer in identifying particular performance features of a vehicle and comparison between two or more vehicles. Along with presenting this information (e.g., on a display device connected to the server 218, a vehicle display, a display located remote from the vehicle information manager), the information may also be stored (e.g., on the storage device 220) at the vehicle information manager 202, at one or more remote locations, etc. Further processing of the metrics, distributions, etc. may also be executed at the vehicle information manager 202 or at one or more locations upon being provided the information (e.g., by using the network 204).

Referring to FIG. 4, two charts 400, 402 are presented that include distribution data collected and processed for two different vehicles. Data collected from the first vehicle, identified as "Vehicle A", is presented in chart 400. In this example, vehicle A is a combustion engine based vehicle and includes a performance manager (such as performance manager 102 shown in FIG. 1) for collecting performance information from the vehicle. As represented in the chart 400, the operating speeds of the vehicle are collected (e.g., from time series data) and are used to define multiple speed ranges. In this particular example, nine ranges (e.g., 0 MPH, 0-10 MPH, 10-20 MPH, 20-30 MPH, 30-40 MPH, 50-60 MPG 60-70 MPH, and +70 MPG) are defined in column 404; however, more or less ranges be used in other arrangements. Along with the operating speeds of the vehicle; travel parameters are also collected/processed and represented in the chart. For the ranges of speeds provided, column 406 represents fuel consumed by the vehicle (in gallons), column 408 represents the time (in hours) spent within each of the speed ranges, and column 410 represents the distance driven for each speed range. Along with these collected travel parameters, the chart 400 also includes calculated performance data. For example, column 412 represents the fuel economy in miles-per-gallon (MPG) determined by dividing distance driven by the time spent within the corresponding speed range of the distribution data. Fuel rate (measured in gallons per hour) is provided by column 414 and is calculated by dividing the fuel consumed by the time spent in the corresponding speed range. The percentage of distance traveled by the vehicle is provided by dividing the distance driven while within the corresponding speed range by the sum of distances traveled for all of the speed ranges (e.g., the sum of the distance values included in column 410). From the collected travel parameters (populated in columns 406, 408 and 410) and calculated values (populated in columns 412, 414 and 416), performance information of the combustion engine based vehicle is provided and may be presented. Additionally, this performance information may be used to compare the performance of Vehicle A and other vehicles.

Chart 402 provides similar distribution data for a vehicle that employs an alternative fuel system, such as a hybrid vehicle, and is identified as "Vehicle B". In some instances, the Vehicle A may also be a hybrid vehicle (e.g., Vehicle B) in which the alternative fuel system (e.g., electric motor) has been deactivated and Vehicle B represents when the alternative fuel system is active. In particular, the chart 402 includes equivalent speed ranges in column 418 and travel parameters collected from the vehicle in column 420 (fuel consumed in gallons), column 422 (time spent in hours) and column 424 (distance driven in miles). Also similar to chart 400, chart 402 includes performance data calculated from the collected travel parameters. In particular, column 426 provides the fuel economy (in MPG) for each of the speed ranges of the distribution. Column 428 provides the calculated fuel rate (in gallons per hour) for each range and column 430 provides the calculated percentage distance traveled within each of the speed ranges. From the information provided from the charts 400 and 402, one or more performance metrics may be computed (e.g., by the performance analyzer 214) for each of the vehicles. Additionally, metrics comparing the performance of the two vehicles may be produced. Also, analysis provided by the performance analyzer 214 may also use information collected from multiple vehicles (e.g., a fleet of similar vehicles) for producing comparison metrics.

Figure 5:
FIG. 5 is a chart of performance information of a collection of combustion engine vehicles.

Referring to FIG. 5, a chart 500 presents distribution data for a collection of vehicles in which each vehicle is driven over comparable routes and distances. However, substantially equivalent routes and distances for each vehicle are not required to produce distribution data. In some arrangements, vehicles of similar type are included in the collection, however, dissimilar vehicles may also be included in some collections. Similar to chart 400 and 402, the chart 500 provides similar travel parameters and performance information. However, since a collection of vehicles provides the information, individual values are generally larger than corresponding values in the single vehicle charts 400 and 402. In particular, chart 500 includes a column 502 that provides the speed ranges that are similarly presented in charts 400 and 402. Column 504 presents the travel parameter collected from the vehicles that represents fuel consumed in gallons for each speed range. Similarly, another travel parameter from the vehicles is presented in column 506 that represents the time spent (in hours) driving at speeds within each of the ranges and column 508 provides the corresponding distance driven in miles for each speed range. In this example, each data value present in the columns 504, 506 and 508 is an aggregate calculated from the vehicles in the collection. Also similar to charts 400 and 402, chart 500 includes performance data calculated from the collected travel parameters. In particular, column 510 provides the fuel economy (in MPG) for each of the speed ranges of the distribution. Column 512 provides the calculated fuel rate (in gallons per hour) for each range and column 514 provides the calculated percentage distance traveled within each of the speed ranges. One or more techniques could be implemented for using this distribution data with the distribution data from the two vehicles (e.g., the combustion engine vehicle provided in chart 400 and the hybrid vehicle 402 shown in FIG. 4). For example, data from the vehicle collection chart 500 may be used to normalize the data of the two vehicles when producing one or more performance and comparison metrics. Similar to using distribution data from a collection of vehicles to normalize data, other data sets may be used to provide this function. For example, the distribution data from the two vehicles for comparison may be combined (e.g., sum the travel parameter elements of columns 406-410 summed with the corresponding travel parameter elements of columns 420-424). One or more sets of predefined data may also be used for producing distribution data to normalize data from distribution of the two vehicles. For example, standard drive cycle test data (e.g., from Federal Test Procedure (FTP) such as FTP-75 for city driving, highway driving (HWFET), aggressive driving (SFTP US06), optional air conditioning test (SFTP SC030), etc.) may be utilized from one or more groups (e.g., US Environmental Protection Agency (EPA), etc.). Other types of data may also be employed for normalizing data (or to execute other types of operations) to develop performance and comparison metrics.

Figure 6:
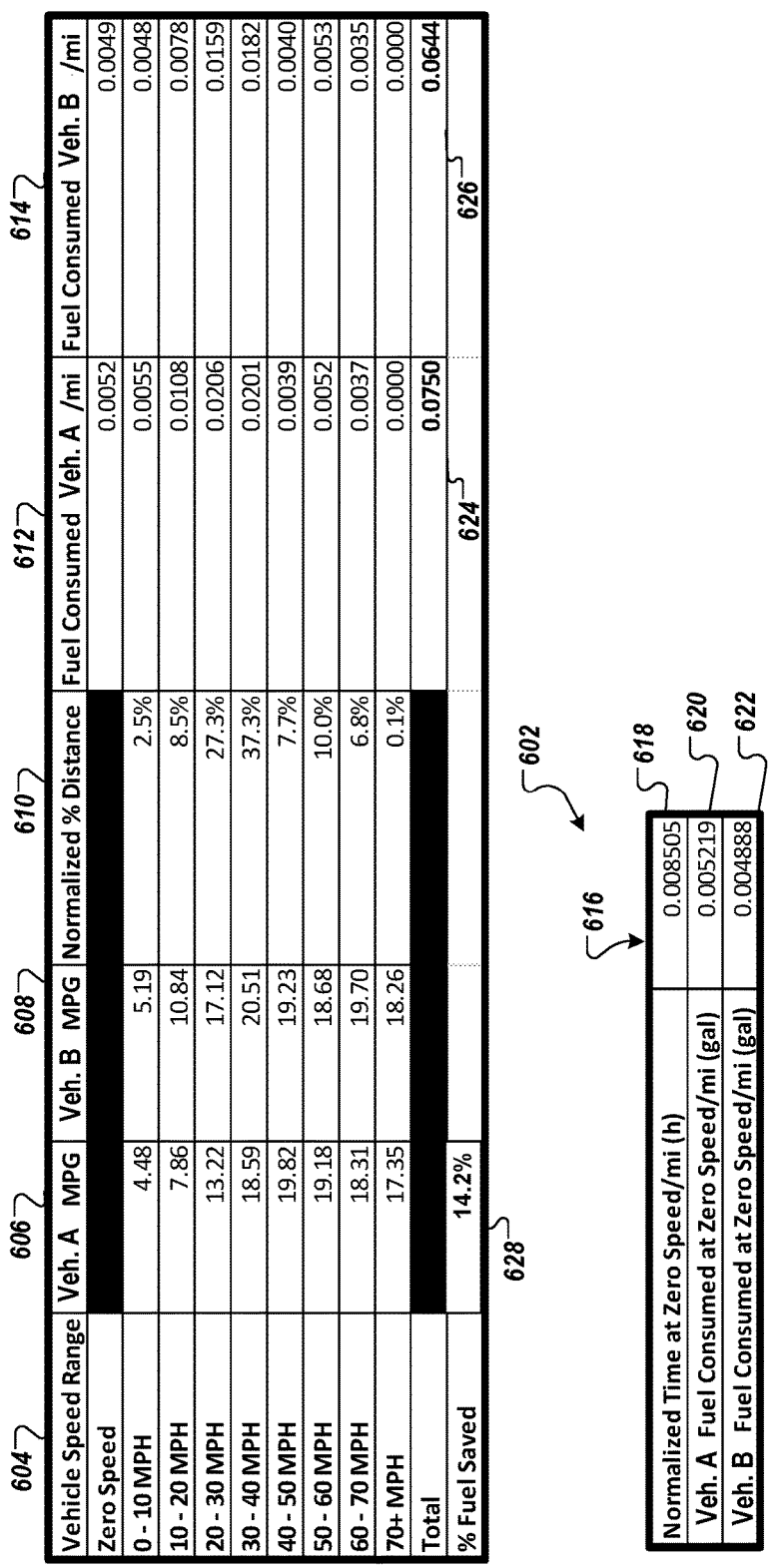
FIG. 6 is a chart of comparative performance information from a performance analyzer.

Referring to FIG. 6, two charts 600 and 602 provide a collection of comparison metrics computed from the distribution data of the two vehicles. In general, the chart 600 presents distribution data from the charts 400, 402 and 500 along with performance metrics and a fuel saving comparison metric. Column 604 provides the same speed ranges used to define the distribution data in charts 400, 402 and 500. Columns 606 and 608 correspondingly provide the fuel economy travel parameter data from the charts 400 and 402

(i.e., columns 412 and 426) for the two vehicles (e.g., the combustion engine vehicle and the hybrid vehicle) and column 610 presents the distance travel percentages from the distribution data for the collection of vehicles (e.g., column 514 of chart 500 shown in FIG. 5).

The chart 602 presents a series of three normalized metrics in column 616, which utilize the distribution data from the vehicle collection provided by chart 500. For entry 618, the time spent at zero MPH (i.e., as provided by the first entry of column 506 of chart 500) for the collection of vehicles is divided by the aggregate of the distance traveled by the vehicle collection (i.e., the sum of the quantities of column 508 in chart 500). This quantity, referred to as the "Normalized Time at Zero Speed" is multiplied by the fuel rate (in gallons per hour) at zero MPH for the combustion engine vehicle (i.e., as provided by the first entry of column 414 of chart 400 as shown in FIG. 4) to provide the entry 620. This normalized metric represents the fuel consumed by the combustion engine vehicle while operating at zero speed. Similarly, the fuel consumed by the hybrid vehicle at zero speed (i.e., entry 622) is determined by multiplying the "Normalized Time at Zero Speed" as provided by entry 618 by the fuel rate (in gallons per hour) at zero MPH for the hybrid vehicle (i.e., as provided by the first entry of column 428 of chart 402).

Returning to chart 600, the column 612 provides the normalized fuel amount consumed by the combustion engine vehicle. The zero speed entry of column 612 (i.e., the first entry) is provided by the entry 620 of chart 602. The other entries of the column 612 are provided by dividing the respective entries of the normalized percentage distance (provided by column 610) by the fuel economy in MPG (provided by column 606). Similarly, the zero speed entry of column 614 (i.e., the first entry) is provided by the entry 622 of chart 602. The other entries of column 614 are provided by dividing the respective entries of the normalized percentage distance (provided by column 610) by the fuel economy in MPG (provided by 608). Entries 624 and 626 of chart 600 are determined by aggregating the entries of the respective columns (above each entry). In particular, entry 624 is computed in this example by summing the entries of column 612 and entry 626 is computed by summing the entries of column 614. The quantities provided in these entries represent the normalized fuel consumed by the combustion engine vehicle (in entry 624) and the normalized fuel consumed by the hybrid vehicle (in entry 626). From these quantities, one or more comparison metrics may be computed; for example, the percentage of fuel conserved by using one of the vehicles in place of the other vehicle. Using the data provided, a comparison metric is determined that represents the percentage of fuel saved by using the hybrid vehicle (Vehicle B) rather than the combustion engine vehicle (Vehicle A). To compute this quantity, first the normalized fuel consumed by the combustion engine vehicle (presented in entry 624) is reduced by the normalized fuel consumed by the hybrid vehicle (presented in entry 626). Next this computed difference is divided by normalized fuel consumed by the combustion engine vehicle. In this particular example, entry 628 reports that the hybrid vehicle (Vehicle B) provides a 14.2% fuel consumption savings over the combustion engine vehicle.

Figure 7:
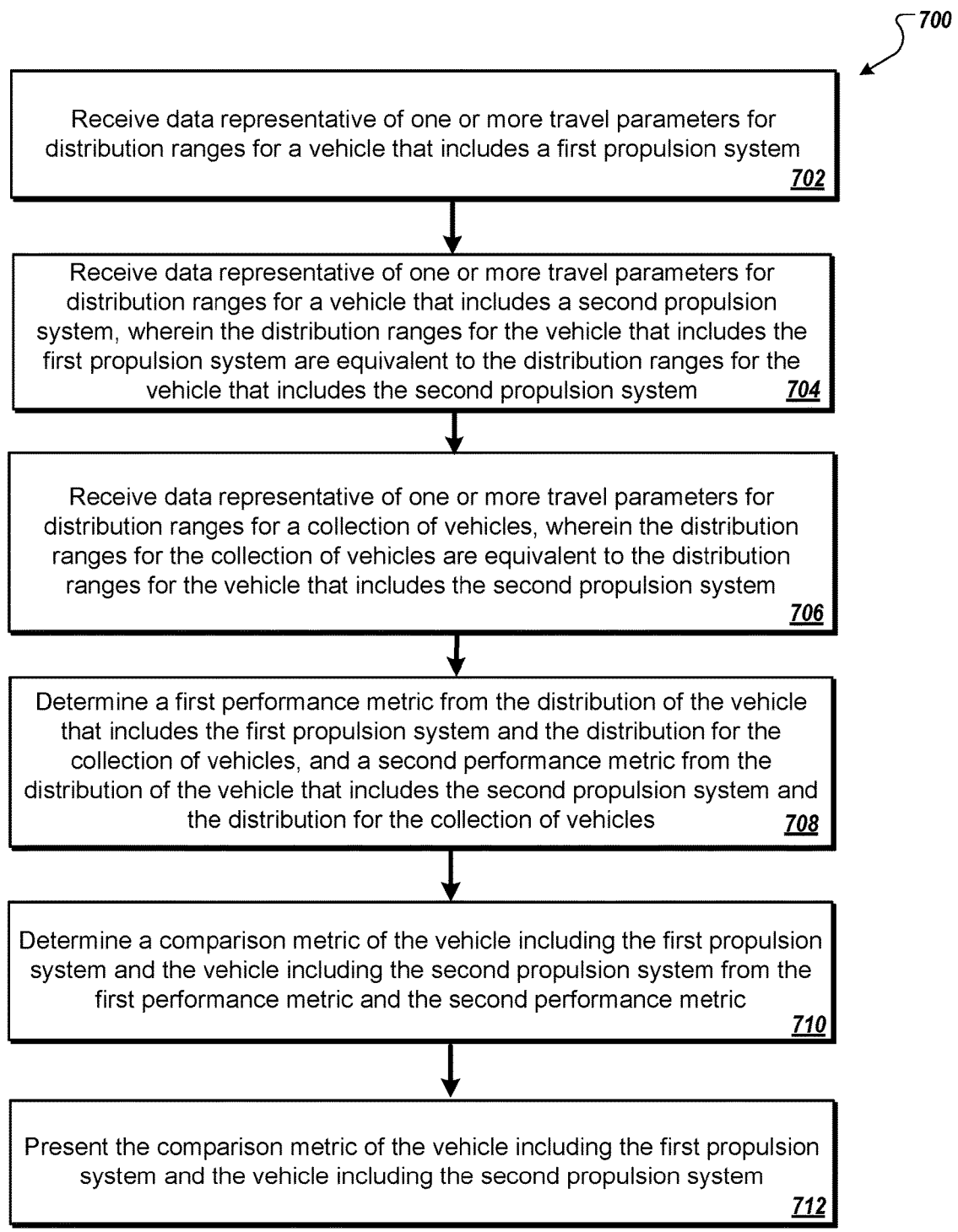
FIG. 7 is a flow chart of representative operations for a performance analyzer.

Referring to FIG. 7, a flowchart 700 represents operations of a computing device, such as a controller (e.g., the controller 104 shown in FIG. 1) executing a performance manager 102 (also shown in FIG. 1), a computing device executing a performance analyzer (e.g., the server 218 located at the vehicle information manager 202), etc. for using distributions of data to determine comparison metrics (e.g., fuel savings) for two or more types of vehicle propulsion systems (e.g., a combustion engine and an electric motor of a hybrid vehicle). Such operations (e.g., of the performance manager 102 and the performance analyzer 214) are typically executed by components (e.g., processors, etc.) included in a single computing device (e.g., an on-board vehicle device such as controller 104 as shown in FIG. 1, an off board computing device such as the server 218 shown in FIG. 2); however, operations may be executed by multiple computing devices. Along with being executed at a single site (e.g., at the vehicle information manager 202, onboard a vehicle, etc.), operation execution may be distributed among two or more locations.

Operations may include receiving 702 data representative of one or more travel parameters for distribution ranges for a vehicle that includes a first propulsion system. For example, data may be received from a combustion engine based vehicle that represents fuel consumed, time spent, distance driven, etc. for a range of speeds (0 MPH, 0-10 MPH, 10-20 MPH etc.) at which the vehicle has been operated (as illustrated in the chart 400 in FIG. 4). Operations may also include receiving 704 data representative of one or more travel parameters for distribution ranges for a vehicle that includes a second propulsion system. For example, data may be received from an alternative fuel vehicle (e.g., a hybrid vehicle when operating its electric motor). The distribution ranges of the vehicle that includes the first propulsion system (e.g., the combustion engine based vehicle) are equivalent to the distribution ranges of the vehicle that includes the second propulsion system (e.g., the alternative fuel vehicle). For example, the speed ranges for the distribution data of the combustion engine based vehicle (e.g., 0 MPH, 0-10 MPH, 10-20 MPH etc.) may match the speed ranges for the distribution data of the hybrid vehicle (e.g., 0 MPH, 0-10 MPH, 10-20 MPH etc.). Operations may also include receiving 706 data representative of one or more travel parameters for distribution ranges for a collection of vehicles. For example, similar to the other two vehicles, data may be received for travel parameters that represent fuel consumed, time spent, distance driven, etc. for a range of speeds. The distribution ranges of the collection of vehicles are equivalent to the distribution ranges of the vehicle that includes the second propulsion system. For example, the speed ranges for the data distribution for the collection of cars (e.g., 0 MPH, 0-10 MPH, 10-20 MPH etc.) may match the speed ranges for the data distribution of the hybrid vehicle (e.g., 0 MPH, 0-10 MPH, 10-20 MPH etc.). Operations may also include determining 708 a first performance metric from the distribution of the vehicle that includes the first propulsion system and the distribution for the collection of vehicles, and a second performance metric from the distribution of the vehicle that includes the second propulsion system and the distribution for the collection of vehicles. For example, as represented in chart 600 (shown in FIG. 6), a performance metric may be determined that represents the normalized fuel consumed by a combustion engine vehicle (provided by entry 624 in chart 600) that is determined from the distribution data of the combustion engine vehicle and the distribution data of the collection of vehicles. Another determined performance metric may represent the normalized fuel consumed by the hybrid vehicle (provided by the entry 626 in chart 600). Operations may also include determining a comparison metric of the vehicle including the first propulsion system and the vehicle including the second propulsion system from the first performance metric and the second performance metric. For example, from the performance metrics that represent the normalized fuel consumed (e.g., entries 624 and 626 of chart 6), the percentage of fuel saved may be determined (e.g., as provided by entry 628 of chart 6). Operations may also include presenting 712 the comparison metric of the vehicle including the first propulsion system and the vehicle including the second propulsion system. For example, once the percentage of fuel saved is determined, a quantity can be presented at one or more locations. Along with presenting at the vehicle information manager 202 (e.g., a display of the server 218), the comparison metric may be presented at remote locations (e.g., provided to one or more businesses for further analysis, provided to one or more vehicles to alert drivers, etc.). By quantifying and presenting such comparisons, improvements may be initiated to conserve fuel, introduce new vehicles into a fleet of vehicles, etc. For example, based upon the presented comparison, alternative fuel vehicles may be introduced into a fleet of vehicles (e.g., delivery vans, etc.) to improve fuel consumption over repetitive routes and driving conditions.

Figure 8:
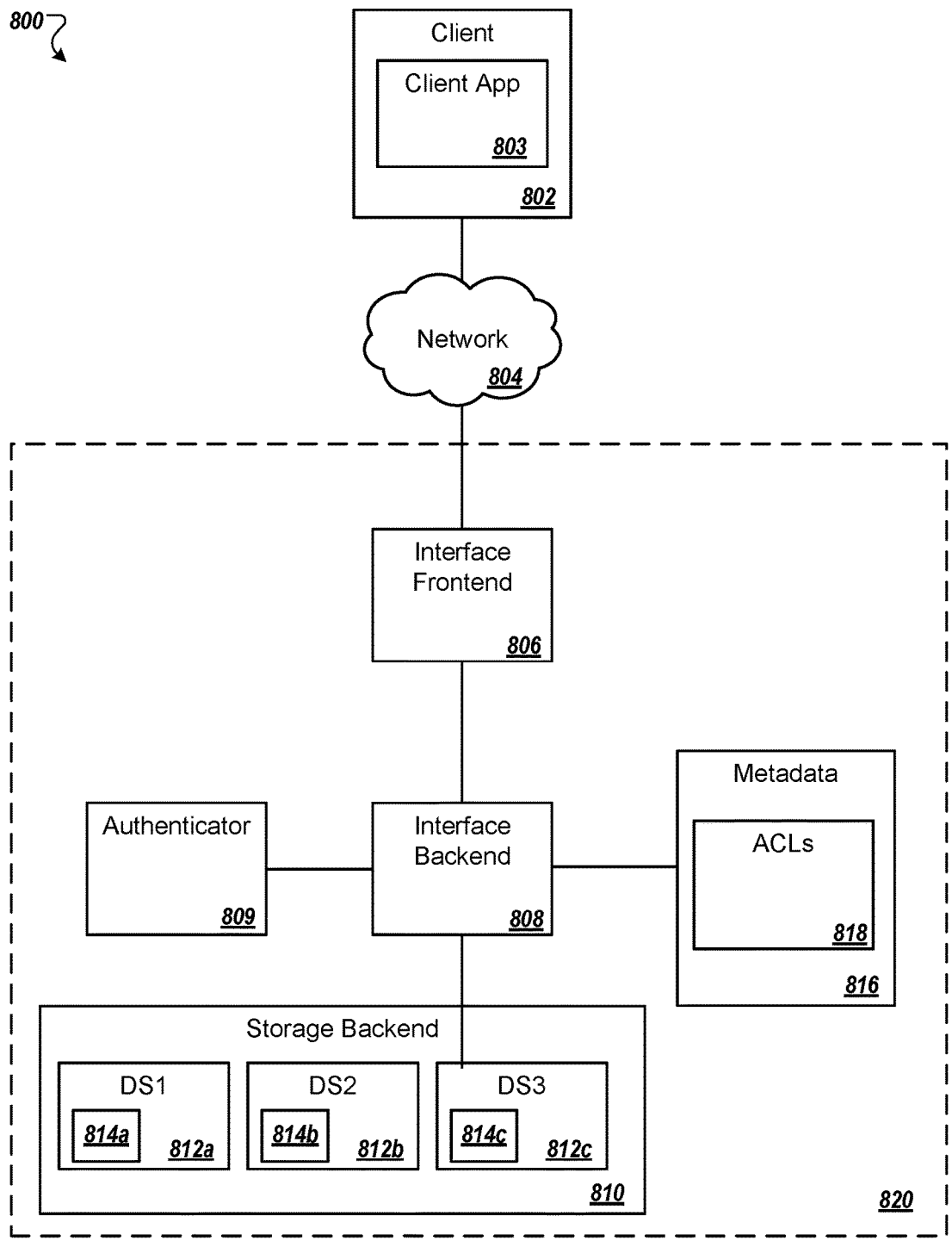
FIG. 8 is a block diagram showing an example of a system for providing hosted storage and accessing the hosted storage from a client device.

FIG. 8 is a block diagram showing an example of a system 800 for providing hosted storage and accessing the hosted storage from a client device 802 (e.g., a computing device, a computing device incorporated into a vehicle, etc.). In some implementations, a hosted storage service 820 may provide access to stored data (e.g., distributions, performance metrics, comparison metrics, etc.) by applications (e.g., web browsers, dedicated applications) running on computing devices operating separately from one another, provide offsite data backup and restore functionality, provide data storage to a computing device with limited storage capabilities, and/or provide storage functionality not implemented on a computing device.

The system 800 may provide scalable stores for storing data resources. The client device 802 may upload data resources to the hosted storage service 820 and control access to the uploaded data resources. Access control may include a range of sharing levels (e.g., private, shared with one or more individuals, shared with one or more groups, public, etc.). Data stored in hosted storage service 820 can be secured from unauthorized access. The hosted storage service 820 can use a simple and consistent application programming interface, or API, which can allow arbitrary quantities of structured or unstructured data to be kept private or shared between individuals, organizations, or with the world at large. The client device 802 may access, retrieve, be provided, store, etc. data in the hosted storage service 820 for any number of a variety of reasons. For example, data may be stored for business reasons (e.g., provide identification information to attain access clearance for font data at the hosted storage service 820), or for use in data processing by other services.

Figure 9:
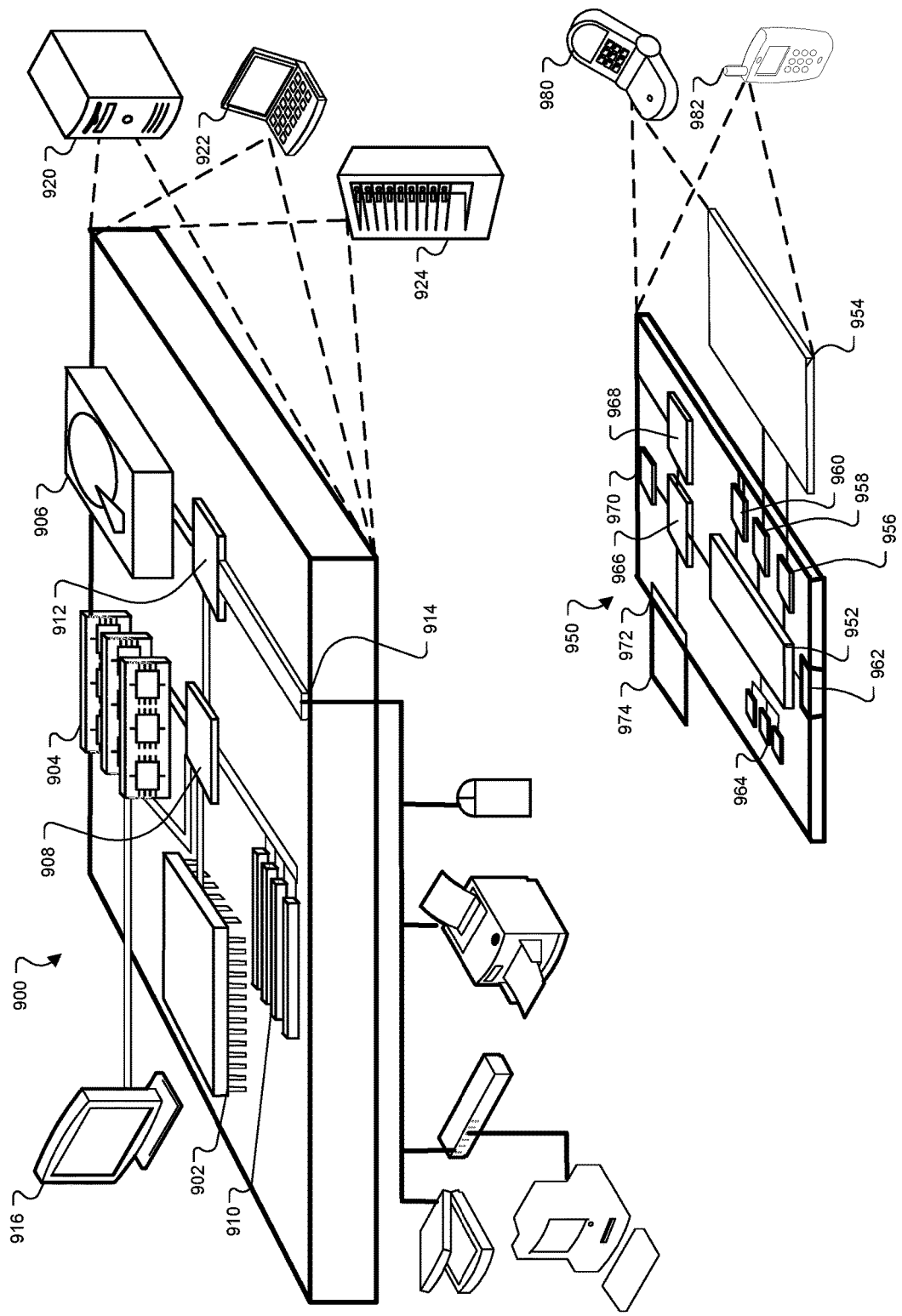
FIG. 9 illustrates an example of a computing device and a mobile computing device that can be used to implement the techniques described here.

The client device 802 may be implemented using a computing device, such as the computing device 900 or the mobile device 950 described with respect to FIG. 9. The client device 802 may communicate with the hosted storage service 820 (e.g., located at the vehicle information manager 202) via a network 804, such as the Internet. The client device 802 may communicate across the network using communication protocols such as one or more of Transmission Control Protocol/Internet Protocol (TCP/IP), Hypertext Transfer Protocol (HTTP), Secure Shell Remote Protocol (SSH), or Application Program Interfaces (API). Electronic mail (e-mail) protocols may also be utilized. For example, one or more e-mail protocols may be used for providing assets (e.g., distributions, metrics, etc.) to an imaging device (e.g., a display) from the hosted storage service 820, a computing device such as the computing device 900 or the mobile device 950, etc. While only a single client device 802 is shown, there may be multiple client devices communicating across the network 804 with the hosted storage service 820 and/or other services and devices.

The hosted storage service 820 may be implemented such that client applications executing on client device 802, such as a client application 803, may store, retrieve, or otherwise manipulate data resources in the hosted storage service 820. The hosted storage service 820 may be implemented by one or more server devices, which may be implemented using a computing device, such as the computing device 900 or mobile device 950 described with respect to FIG. 9. For example, the hosted storage service 820 may be implemented by multiple server devices operating in the same, or different, data centers.

The hosted storage service 820 generally includes an interface frontend 806, an interface backend 808, a storage backend 810, and metadata 816 for resources stored in the storage backend 810. The hosted storage service 820 may also include an authenticator 809 to verify that a user requesting distribution data, performance metrics, comparison metrics, etc. should be provided access to the data (e.g., based on a service subscription, rental period, etc.).

In general, the interface frontend 806 may receive requests from and send responses to the client device 802. For instance, the hosted storage service 820 may be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Interface frontend 806 may receive messages from the client 802 and parse the requests into a format usable by the hosted storage service 820, such as a remote procedure call (RPC) to an interface backend 808. The interface frontend 806 may write responses generated by the hosted storage service 820 for transmission to the client 802. In some implementations, multiple interface frontends 806 may be implemented; for example to support multiple access protocols.

The interface frontend 806 may include a graphical front end, for example to display on a web browser for data access. The interface frontend 806 may include a sub-system to enable managed uploads and downloads of large files (e.g., for functionality such as pause, resume, and recover from time-out). The interface frontend 806 may monitor load information and update logs; for example to track and protect against denial of service (DOS) attacks.

As described above, the Web Service API may be a REST-based HTTP interface. In a REST-based interface, a data resource is accessed as a resource, uniquely named using a uniform resource identifier (URI), and the client application 803 and service 820 exchange representations of resource state using a defined set of operations. For example, requested actions may be represented as verbs, such as by HTTP GET, PUT, POST, HEAD, and DELETE. The GET verb may be used to retrieve a resource, while the HEAD verb may be used to retrieve information about a resource without retrieving the resource itself. The DELETE verb may be used to delete a resource from the hosted storage service 820. The PUT and POST verbs may be used to upload a resource to the service 820. PUT requests may come from the client 802 and contain authentication, authorization credentials, and resource metadata in a header, such as an HTTP header. POST requests may be received when a client 802 wants to upload from a web browser form. The form POST upload protocol for the hosted storage service 820 may involve multiple form fields to provide authentication, authorization, and resource metadata. More generally, any of the API requests may include credentials for authentication and authorization; for example in a header of the request. An authorization header may be included in the REST requests, which may include an access key to identify the entity sending the request.

Alternatively, or additionally, a user may be authenticated based on credentials stored in a browser cookie, which may be appended to the API requests. If no valid cookie is present, a redirect to an authentication frontend may be generated, and the authentication frontend may be used to generate the browser cookie. The authentication frontend may be used by systems and services in addition to the hosted storage service 820 (e.g., if the organization operating the hosted storage service 820 also operates other web services such as email service). A user may also or alternatively be authenticated based on authentication credentials from an external credentialing service or an external service that includes credentialing functionality. User or group identification information may be calculated from the external service's credential information. Requests sent by the client 802 to the interface frontend 806 may be translated and forwarded to the external service for authentication.

In general, resources stored in the hosted storage service 820 may be referenced by resource identifiers. The hosted storage service 820 may define namespaces to which a valid resource identifier must conform. For example, the namespace may require that resource identifiers be a sequence of Unicode characters whose UTF-8 encoding is at most 1024 bytes long. As another example, the namespace may require that resource identifiers be globally unique identifiers (GUIDs), which may be 128-bit integers.

Resources (e.g., distributions, performance metrics, comparison metrics, etc.) may be stored in hosted storage service 820 in buckets. In some examples, each bucket is uniquely named in the hosted storage service 820, each data resource is uniquely named in a bucket, and every bucket and data resource combination is unique. Data resources may be uniquely identified by a URI that includes the bucket name and the resource name, and identifies the hosted storage service 820. For example, a resource named "/comparison_metrics.dat" in a bucket named "metrics" could be specified using a URI pattern such as http://s.hostedstoragesystem.com/metrics/comparison_metrics.dat or http://fonts.s.hostedstoragesystem.com/comparison_metrics.dat. Alternatively, the user of the client 802 may create a bucket named my.metrics.org, publish a CNAME alias redirected to http://fonts.s.hostedstoragesystem.com, and address the resource as http://my.metrics.org/comparison_metrics.dat. In some examples, buckets do not nest.

The interface backend 808 along with the authenticator 809 may handle request authentication and authorization, may manage data and metadata, and may track activity such as for billing. For example, the interface backend 1208 may query the authenticator 809 when a request for one or more fonts is received. The interface backend 808 may also provide additional or alternative functionality. For example, the interface backend 808 may provide functionality for independent frontend/backend scaling for resource utilization and responsiveness under localized heavy loads. Data management may be encapsulated in the interface backend 808 while communication serving may be encapsulated in the interface frontend 806. The interface backend 808 may isolate certain security mechanisms from the client-facing interface frontend 806.

The interface backend 808 may expose an interface usable by both the interface frontend 806 and other systems. In some examples, some features of the interface backend 808 are accessible only by an interface frontend (not shown) used by the owners of the hosted storage service 820 (internal users). Such features may include those needed for administrative tasks (e.g., resolving a resource reference to a low level disk address). The interface backend 808 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 808 may manage metadata 816 associated with data resources, for example in a MySQL database or BigTable. User-specified names labeling the buckets can be completely defined within the metadata 816, and resource metadata 816 can map a resource name to one or more datastores 812 storing the resource. The metadata 816 can also contain bucket and resource creation times, resource sizes, hashes, and access control lists 818 (ACL 818) for both buckets and resources. The interface backend 808 can log activity and track storage consumption to support accounting for billing and chargebacks. In some examples, this includes quota monitoring in each dimension in which customers are charged (e.g., reads, writes, network transfers, total storage in use).

The ACLs 818 may generally define who is authorized to perform actions on corresponding buckets or resources, and the nature of the permitted actions. The ACLs 818 may be an unordered list of {scope, role} pairs, plus Boolean flags. The scope may define a user or group of users and the role may define the access permissions for the user or group. In some examples, the union of all {scope, role} pairs may define access rights. In some examples, more specific {scope, role} pairs may override more general ones.

The storage backend 810 may contain multiple datastores 812a-812c. Although three datastores 812 are shown, more or fewer are possible. Each of the datastores 812a-812c may store data resources 814a-814c in a particular format. For example, data store 812a may store a data resource 814a as a Binary Large Object (BLOB), data store 812b may store a data resource 814b in a distributed file system (e.g., Network File System), and data store 812c may store a data resource 814c in a database (e.g., MySQL).

FIG. 9 shows an example computer device 900 and example mobile computer device 950, which can be used to implement the techniques described herein. For example, a portion or all of the operations of a performance manager (e.g., the performance manger 102 shown in FIG. 1) and/or a performance analyzer (e.g., the performance analyzer 214 shown in FIG. 2) may be executed by the computer device 900 and/or the mobile computer device 950. Computing device 900 is intended to represent various forms of digital computers, including, e.g., laptops, desktops, workstations, personal digital assistants, servers, blade servers, mainframes, and other appropriate computers. Computing device 950 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906 to display graphical data for a GUI on an external input/output device, including, e.g., display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

Memory 904 stores data within computing device 900. In one implementation, memory 904 is a volatile memory unit or units. In another implementation, memory 904 is a non-volatile memory unit or units. Memory 904 also can be another form of computer-readable medium, including, e.g., a magnetic or optical disk.

Storage device 906 is capable of providing mass storage for computing device 900. In one implementation, storage device 906 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 904, storage device 906, memory on processor 902, and the like.

High-speed controller 908 manages bandwidth-intensive operations for computing device 900, while low speed controller 912 manages lower bandwidth-intensive operations. Such allocation of functions is an example only. In one implementation, high-speed controller 908 is coupled to memory 904, display 916 (e.g., through a graphics processor or accelerator), and to high-speed expansion ports 910, which can accept various expansion cards (not shown). In the implementation, low-speed controller 812 is coupled to storage device 806 and low-speed expansion port 914. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer, e.g., laptop computer 922. In some examples, components from computing device 900 can be combined with other components in a mobile device (not shown), e.g., device 950. Each of such devices can contain one or more of computing device 900, 950, and an entire system can be made up of multiple computing devices 900, 950 communicating with each other.

Computing device 950 includes processor 952, memory 964, and an input/output device including, e.g., display 954, communication interface 966, and transceiver 968, among other components. Device 950 also can be provided with a storage device, including, e.g., a microdrive or other device, to provide additional storage. Components 950, 952, 964, 954, 966, and 968, may each be interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for the coordination of the other components of device 950, including, e.g., control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations. Multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 850 through expansion interface 972, which can include, for example, a SIMM (Single In Line Memory Module) card interface. Such expansion memory 974 can provide extra storage space for device 950, or can also store applications or other data for device 950. Specifically, expansion memory 974 can also include instructions to carry out or supplement the processes described above, and can include secure data. Thus, for example, expansion memory 974 can be provided as a security module for device 950 and can be programmed with instructions that permit secure use of device 950. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 964, expansion memory 974, and/or memory on processor 952, which can be received, for example, over transceiver 968 or external interface 962.

Device 950 can communicate wirelessly through communication interface 966, which can include digital signal processing circuitry where necessary. Communication interface 966 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, including, e.g., using a Bluetooth®, WiFi, or other such transceiver (not shown). In addition, GPS (Global Positioning System) receiver module 970 can provide additional navigation- and location-related wireless data to device 950, which can be used as appropriate by applications running on device 950.

Device 950 also can communicate audibly using audio codec 960, which can receive spoken data from a user and convert it to usable digital data. Audio codec 960 can likewise generate audible sound for a user, including, e.g., through a speaker, e.g., in a handset of device 950. Such sound can include sound from voice telephone calls, can include recorded sound (e.g., voice messages, music files, and the like) and also can include sound generated by applications operating on device 950.

Computing device 950 can be implemented in a number of different forms, as shown in the figure. For example, it can be implemented as cellular telephone 980. It also can be implemented as part of smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user, and a keyboard, and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
receiving data representative of one or more travel parameters for distribution ranges for a vehicle that includes a first propulsion system;
receiving data representative of one or more travel parameters for distribution ranges for a vehicle that includes a second propulsion system, wherein the distribution ranges for the vehicle that includes the first propulsion system are equivalent to the distribution ranges for the vehicle that includes the second propulsion system;
determining a comparison metric of the vehicle including the first propulsion system and the vehicle including the second propulsion system from the first performance metric and the second performance metric; and
generating a control strategy for controlling one or more components of at least one of the first propulsion system and the second propulsion system based on the comparison metric.

2. The computing device-implemented method of claim 1, wherein the first propulsion system includes a combustion engine.

3. The computing device-implemented method of claim 1, wherein the second propulsion system includes an alternative fuel system.

4. The computing device-implemented method of claim 1, wherein the ranges of the distribution of the vehicle that includes the first propulsion system represent speeds.

5. The computing device-implemented method of claim 1, wherein the ranges of the distribution of the vehicle that includes the first propulsion system represent accelerations.

6. The computing device-implemented method of claim 1, wherein the comparison metric represents fuel savings between the vehicle that includes the second propulsion system and the vehicle that includes the first propulsion system.

7. The computing device-implemented method of claim 1, wherein the vehicle that includes the second propulsion system also includes the first propulsion system.

8. The computing device-implemented method of claim 1, wherein determining the comparison metric is executed external to the vehicle that includes the first propulsion system and the vehicle that includes the second propulsion system.

9. The computing device-implemented method of claim 1, further comprising transmitting the control strategy for controlling the one or more components of the at least one of the first propulsion system and the second propulsion system to the vehicle to control the one or more components.

10. A system comprising:
a computing device comprising:
a memory configured to store instructions; and
a processor to execute the instructions to perform operations comprising:
receiving data representative of one or more travel parameters for distribution ranges for a vehicle that includes a first propulsion system;
receiving data representative of one or more travel parameters for distribution ranges for a vehicle that includes a second propulsion system, wherein the distribution ranges for the vehicle that includes the first propulsion system are equivalent to the distribution ranges for the vehicle that includes the second propulsion system;
determining a comparison metric of the vehicle including the first propulsion system and the vehicle including the second propulsion system from the first performance metric and the second performance metric; and
generating a control strategy for controlling one or more components of at least one of the first propulsion system and the second propulsion system based on the comparison metric.

11. The system of claim 10, wherein the first propulsion system includes a combustion engine.

12. The system of claim 10, wherein the second propulsion system includes an alternative fuel system.

13. The system of claim 10, wherein the ranges of the distribution of the vehicle that includes the first propulsion system represent speeds.

14. The system of claim 10, wherein the ranges of the distribution of the vehicle that includes the first propulsion system represent accelerations.

15. The system of claim 10, wherein the comparison metric represents fuel savings between the vehicle that includes the second propulsion system and the vehicle that includes the first propulsion system.

16. The system of claim 10, wherein the vehicle that includes the second propulsion system also includes the first propulsion system.

17. The system of claim 10, wherein determining the comparison metric is executed external to the vehicle that includes the first propulsion system and the vehicle that includes the second propulsion system.

18. One or more non-transitory computer readable media storing instructions that are executable by a processing device, and upon such execution cause the processing device to perform operations comprising:
receiving data representative of one or more travel parameters for distribution ranges for a vehicle that includes a first propulsion system;
receiving data representative of one or more travel parameters for distribution ranges for a vehicle that includes a second propulsion system, wherein the distribution ranges of the vehicle that includes the first propulsion system are equivalent to the distribution ranges of the vehicle that includes the second propulsion system;
determining a comparison metric of the vehicle including the first propulsion system and the vehicle including the second propulsion system from the first performance metric and the second performance metric; and
generating a control strategy for controlling one or more components of at least one of the first propulsion system and the second propulsion system based on the comparison metric.

19. The computer readable media of claim 18, wherein the first propulsion system includes a combustion engine.

20. The computer readable media of claim 18, wherein the second propulsion system includes an alternative fuel system.

21. The computer readable media of claim 18, wherein the ranges of the distribution of the vehicle that includes the first propulsion system represent speeds.

22. The computer readable media of claim 18, wherein the ranges of the distribution of the vehicle that includes the first propulsion system represent accelerations.

23. The computer readable media of claim 18, wherein the comparison metric represents fuel savings between the vehicle that includes the second propulsion system and the vehicle that includes the first propulsion system.

24. The computer readable media of claim 18, wherein the vehicle that includes the second propulsion system also includes the first propulsion system.

25. The computer readable media of claim 18, wherein determining the comparison metric is executed external to the vehicle that includes the first propulsion system and the vehicle that includes the second propulsion system.

* * * * *